United States Patent [19]

Lawrence et al.

[11] Patent Number: 4,640,367
[45] Date of Patent: Feb. 3, 1987

[54] ROLL-OVER DISC PLOW

[75] Inventors: Ventura J. Lawrence; Charles G. Metcalf, both of Stockton; Lawrence H. Silva, Manteca, all of Calif.

[73] Assignee: Tractor Plow Co., Inc., Stockton, Calif.

[21] Appl. No.: 793,829

[22] Filed: Nov. 1, 1985

[51] Int. Cl.[4] ................................................ A01B 3/42
[52] U.S. Cl. .................................................. 172/225
[58] Field of Search ............... 172/204, 212, 219, 220, 172/224, 225, 226, 227, 574, 603, 776

[56] References Cited

U.S. PATENT DOCUMENTS

| 2,777,373 | 1/1957 | Pursche | 172/212 |
| 4,067,396 | 1/1978 | Watts | 172/225 |
| 4,165,787 | 8/1979 | Perkins | 172/219 |
| 4,207,951 | 6/1980 | Wilcox et al. | 172/225 |

FOREIGN PATENT DOCUMENTS

| 2419119 | 11/1974 | Fed. Rep. of Germany | 172/225 |
| 1268430 | 6/1961 | France | 172/224 |

Primary Examiner—Richard T. Stouffer
Attorney, Agent, or Firm—Lothrop & West

[57] ABSTRACT

A base frame for a roll-over disc plow is symmetrical about a longitudinal axis and is adapted to be secured to a standard tractor hitch. A plow frame overlies and is pivoted to the base frame about the longitudinal axis. The plow frame is hydraulically moved about one hundred eighty degrees between extreme positions, in each instance lying against a respective one of a pair of steps effective to transmit forces between the towed base frame and a plow frame carrying two alternately used series of plow discs.

6 Claims, 8 Drawing Figures

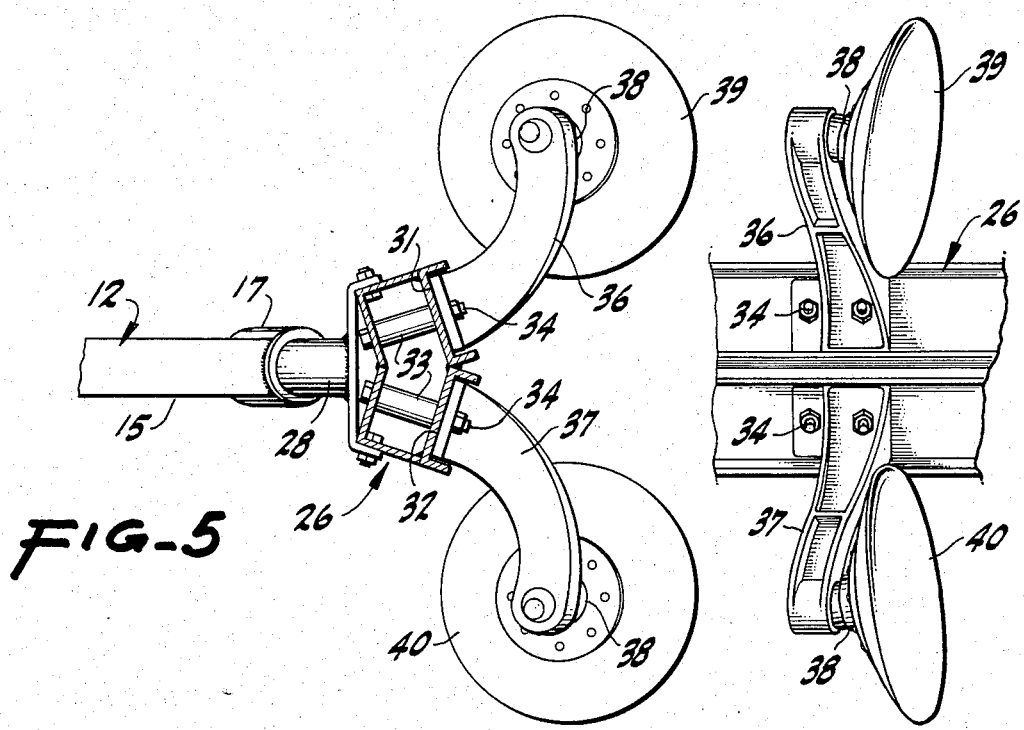
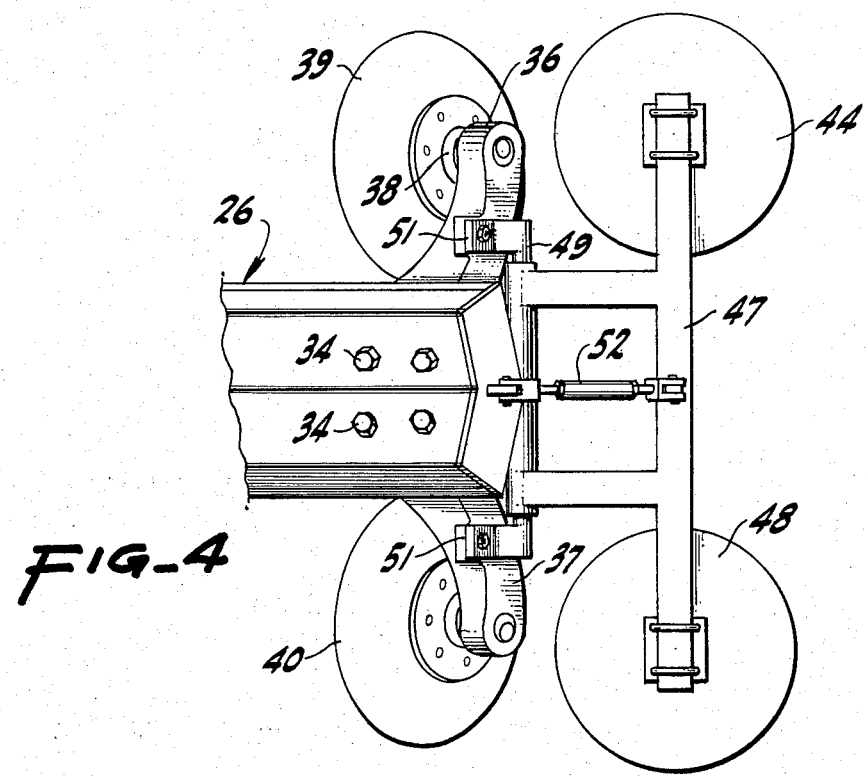

ROLL-OVER DISC PLOW

BACKGROUND OF THE INVENTION

There is a continuing need for plows, particularly of the gang, disc plow nature, effective to make maximum use of the tractive effort of a tractor and to provide a well-prepared, uniform planting bed in the earth. While there have been a relatively large number of such devices manufactured and patented, there is still a need for such a plow that balances and effectively uses the tractive effort on the plow, is easy to maneuver and handle, and is easy to invert and return.

FIELD OF THE INVENTION

The invention herein is embodied in forms that include gangs of disc plows effective in providing the desired plowing activity and in forms suitable for reversing when drawn in opposite directions by customarily available tractors.

DESCRIPTION OF THE RELATED ART

A preliminary search has disclosed the references listed below:

| | | |
|---|---|---|
| 1,042,651 | Davis et al. | October 29, 1912 |
| 2,676,524 | Bashor | April 27, 1954 |
| 3,307,635 | Ward | March 7, 1967 |
| 3,507,334 | Watts | April 21, 1970 |
| 3,554,294 | Morkoski et al. | January 12, 1971 |
| 3,730,279 | Dowdeswell | May 1, 1973 |
| 3,749,178 | Watts | July 31, 1973 |
| 3,980,141 | Vest, Jr. | September 14, 1976 |
| 4,067,396 | Watts | January 10, 1978 |
| 4,165,787 | Perkins | August 28, 1979 |
| 4,207,951 | Wilcox et al. | June 17, 1980 |

Of the foregoing patents, the Davis et al. patent discloses a disc plow having a mounting of the sort that is utilized herein, this patent being referred to in the description hereof.

The Bashor patent shows disc plows but in only a single rank, whereas multiple ranks or gangs are utilized herein.

The Ward patent utilizes mold board plows and is primarily concerned with a reversing device, rather than an entire plowing mechanism.

The Watts Pat. No. 3,507,334 is concerned with mold board plows and especially with a synchronized, guided tail wheel.

The Morkoski et al. patent is especially concerned with a particular reversing mechanism for a two-way plow.

The Dowdeswell patent is concerned with a plow support incorporating a laterally swinging wheel support arm.

The Watts Pat. No. 3,749,178 is primarily concerned with an arrangement for adding plow bottoms to the principal plowing structure.

The Vest, Jr. patent is concerned primarily with mounting mold board plows in a particular location with respect to a support bearing.

The Watts Pat. No. 4,067,396 is especially concerned with a dual cylinder reversing mechanism for a two-way plow.

The Perkins patent is concerned with a single bank of disc plows having particular guide wheel devices for counteracting side draft forces.

The Wilcox et al. patent utilizes two sets of mold board plows with a special hydraulic arrangement for inversion and handling of the inverted plows.

SUMMARY OF THE INVENTION

A roll-over disc plow has a base frame substantially triangular in plan, symmetrical about a longitudinal axis and adapted to be attached to a standard tractor hitch. A plow frame has a plow beam extending symmetrically and diagonally across the axis and a transverse leading beam. Journals coincident with the axis connect the plow frame to the base frame. Hydraulic means connected between the base frame and the plow frame pivot the plow frame about the axis through one hundred eighty degrees and move the leading beam of the plow frame between extreme positions just ahead of abutting steps on the base frame. Two sets or gangs of plow discs are mounted on dihedral faces of the plow beam, each set lying symmetrically with respect to the axis and well under the plow beam in each extreme position of the plow frame.

BRIEF DESCRIPTION OF THE SEVERAL VIEWS OF THE DRAWINGS

FIG. 4 is a side elevation comparable to FIG. 3 but showing a different part of the structure as indicated by the line 4—4 of FIG. 1.

FIG. 5 is a cross-section, the plane of which is indicated by the line 5—5 of FIG. 1.

FIG. 6 is a view along the line 6—6 of FIG. 1 and with portions broken away showing the structure illustrated in FIG. 5.

DESCRIPTION OF THE PREFERRED EMBODIMENT

Figure 7:
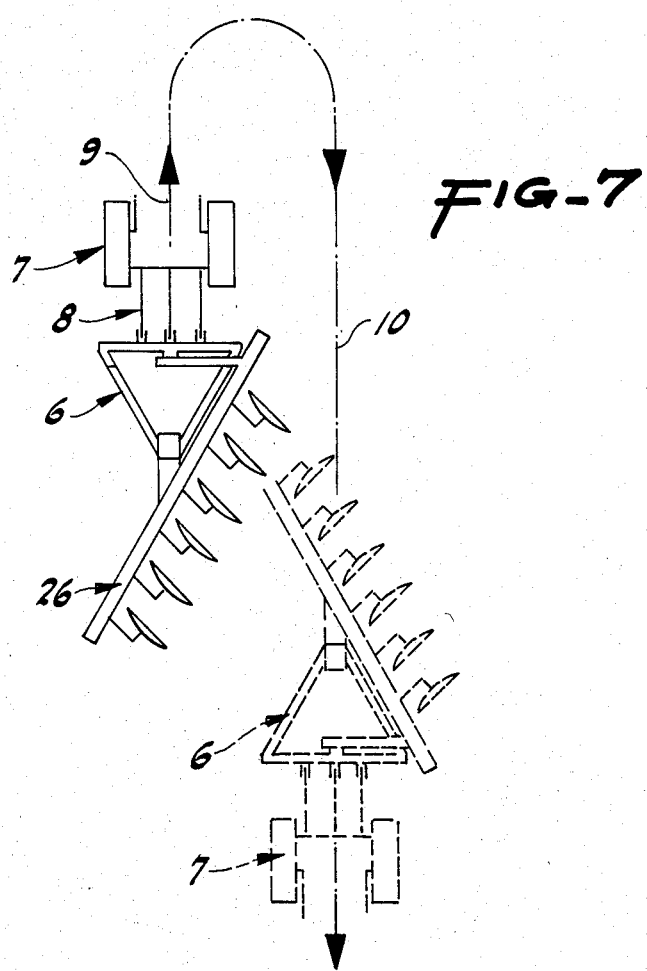
FIG. 7 is a diagram in plan showing a typical path of operation of the structure.

As especially shown in FIG. 7, the current device is a roll-over disc plow 6 drawn behind a standard tractor 7 through the intermediacy of a standard hitch mechanism 8. The plow is drawn in an initial direction along an axis 9 to the end of a row, whereupon the tractor makes a half turn to reverse its direction and travels along a parallel axis 10 in the opposite fashion with the plow 6 being reversed during such direction reverse.

The plow 6 includes a base frame 12 generally triangular in plan. It is made up of structural members including a leading beam 13 extending transversely. At its opposite ends the beam is welded to a pair of side beams 14 and 15 that converge in a rearward direction to an area of convergence at which a rearward journal 17 is disposed. The journal is symmetrical about a longitudinal axis 18 on which is also disposed a forward journal 19 incorporated with the leading beam 13.

The leading beam is provided with a number of attaching plates 21 designed to carry pins 22 for joining the plow structure to a standard three-point hitch of the tractor itself.

United with the base frame 12 for rotation about the axis 18 through approximately one hundred eighty degrees is a plow beam 26 disposed substantially symmetrically in plan with respect to the axis 18. A cross beam 27 is removably united with the plow beam 26 and is designed to rotate about the axis and on the forward journal 19. A similar connector 28 also joined to the plow beam 26 by detachable fastenings is rotatable in the journal 17 about the axis 18. The plow beam is made detachable for ease in shipment.

The plow beam 26 is made up, especially as illustrated in FIGS. 4, 5 and 6, of structural shapes and plates so as to afford a pair of laterally and outwardly directed surfaces or side faces 31 and 32 disposed out of the same plane and forming a dihedral angle with respect to each other. The shapes and plates are reinforced by tubes 33 that receive fastenings 34 for holding in place disc plow mounting arms in two comparable gangs or sets 36 and 37. Each arm 36 or 37 is of a standard shape as shown in the Davis et al. Pat. No. 1,042,651. Just as in the Davis et al. patent, the arms in each set 36 and 37 include special, eccentrically rotatable adjusting carriers 38. These receive and orient the rotary shafts of two sets of plow discs 39 and 40. The two sets of plow discs alternate in use. While they are generally in vertical registry with each other, because of the dihedral angle of the faces 31 and 32 of the mounting beam 26, the ground-engaging plow discs are positioned more nearly under the plow beam 26 than they would be were the beam 26 provided with a single vertical side face. This angular relationship is effective in effectively imposing the plowing forces on the beam and in transmitting the plowing forces more nearly under the beam to reduce the lateral displacement or skewing forces thereon.

The plow discs 39 and 40 are arranged at approximately evenly spaced intervals along the diagonal length of the plow beam and are also distributed along such length so that approximately half of the plow discs lie on one side of the axis 18. Precise division is not necessarily followed because there are mounted at the trailing end of the plow beam a pair of guide discs 44 and 48 similar in nature to the plow discs but substantially flat. The discs 44 and 48 are mounted in vertical registration for rotation on axles 46 carried in a frame 47 (FIG. 4). The frame 47 is rotatable about a cross vertical shaft 49 secured by brackets 51 to the adjacent frames 36 and 37 of the trailing plow discs. A turnbuckle adjuster 52 is effective to orient the plane of the effective disc 44 or 48 with respect to the ground, so that residual side thrust from the operation of the associated gang or series of plow discs is appropriately counteracted.

Figure 1:
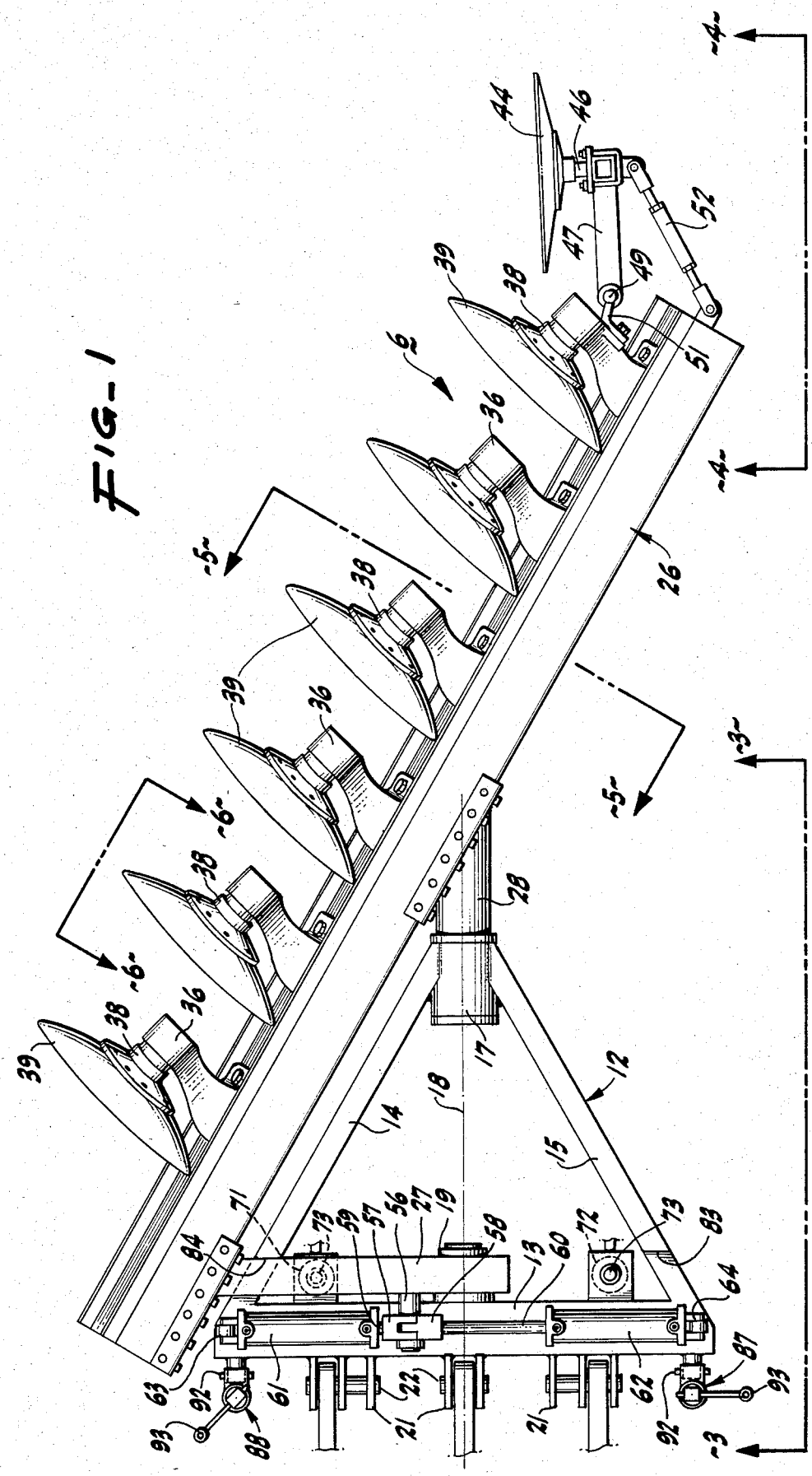
FIG. 1 is a plan of the device of the invention shown in one of its two extreme positions, certain portions of the associated structure being broken away to reduce the size of the figure.
Figure 2:
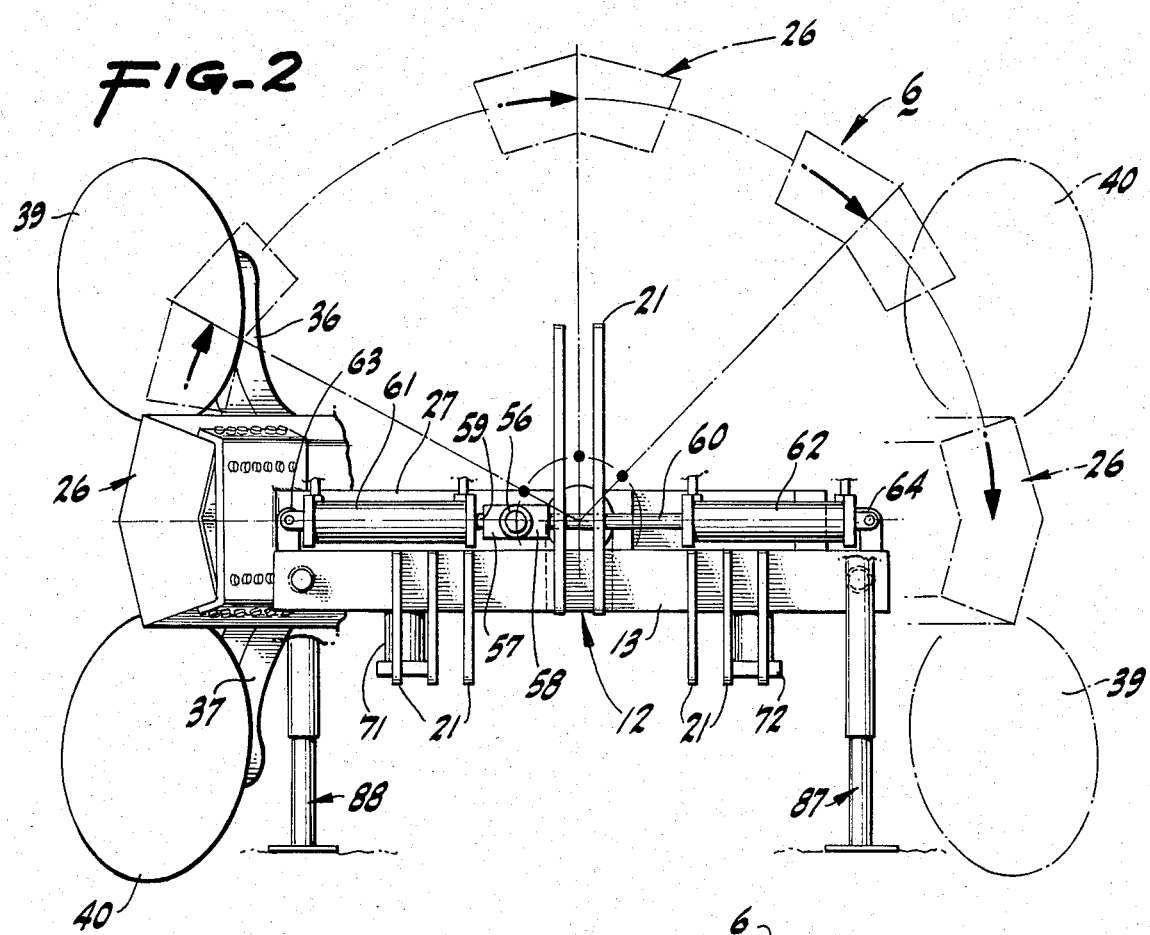
FIG. 2 is a front elevation of the plow structure looking rearwardly and showing in broken lines various positions of the plow mechanism in shifting from one extreme location to another.
Figure 3:
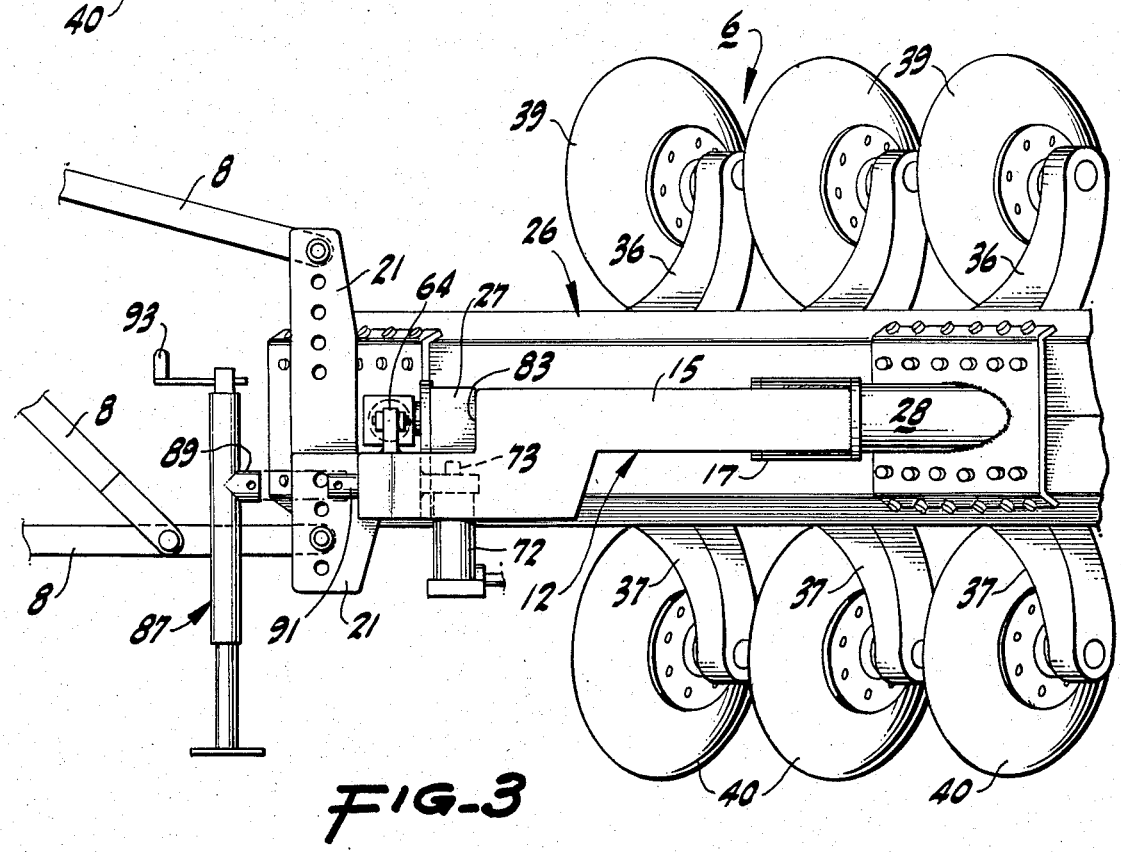
FIG. 3 is a side elevation, as indicated by the line 3—3 of FIG. 1, with portions of the structure broken away to reduce the size of the figure.

Since it is intended that the plow beam 26 be rotated about the axis 18 from time to time, an appropriate hydraulic mechanism is utilized for that purpose. As particularly illustrated in FIGS. 1, 2 and 3, the cross beam 27 mounted on the journal 19 also carries an offset crank pin 56 extending forwardly over the leading beam 13. This pin 56 is engaged by the journalled ends 57 and 58 of a pair of hydraulic piston rods 59 and 60 each extending from a piston (not shown) reciprocable within a respective one of two hydraulic cylinders 61 and 62. At their remote ends these cylinders are connected through coplanar pivots 63 and 64 to the base frame.

In both extreme positions of the plow beam 26 with respect to the base frame 12 the piston rods 59 and 60 are in straight, locking alignment and so have no crank effect. For this reason there are provided on the leading beam 13 at either side of the center thereof one of a pair of auxiliary cylinders 71 and 72. These are mounted on the base frame 12 and have upwardly extending plunger rods 73 adapted when projected to abut the adjacent underside of the cross beam 27. When hydraulically actuated, the plungers 73 rise for a limited distance. The effective rod 73 initially lifts the cross beam 27 to a point far enough away from a straight line, dead center position so that the cylinders 61 and 62 can be fully effective. In this way, the plow beam 26 is pivoted about the axis 18 from one extreme position into the other extreme position approximately a half turn away from the initial location. This reversal or inversion in position of the plow beam 26 and the associated disc plows 39 and 40 is performed when the tractor hitch 8 is in a sufficiently elevated location so that there is no ground interference with the rotation of the rearward portion of the plow beam and the rearward plow discs. The effect of the half turn is to lift the momentarily lower rank of disc plows into an upper position and to put the previously upper rank of disc plows into a lower, plowing position, the guide discs 44 and 48 also being simultaneously inverted.

Figure 8:
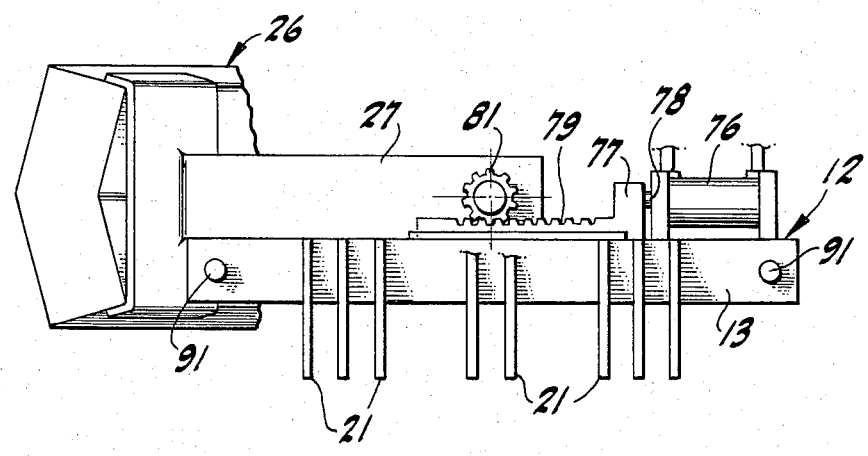
FIG. 8 is a view comparable to FIG. 2 showing in front elevation a modified form of actuating device, various portions being broken away.

As an alternative form of inverting mechanism, as shown in FIG. 8, the leading beam 13 is provided with but a single, double-acting hydraulic cylinder 76. The plunger rods 73 and their associated structures and circuitry may, but need not, be eliminated. There is a reciprocating connection 77 at one end of its piston rod 78 with a rack 79 slidable on the leading beam 13 in engagement with a pinion 81 fast on the journal pin 19, which in turn is fast on the cross beam 27. In this instance, when the cylinder 76 is supplied at one end with hydraulic fluid under pressure, the rack 79 is translated and so rotates the pinion 81 and correspondingly rotates the plow beam 26. When the other end of the cylinder 76 is supplied with hydraulic fluid under pressure, the plow beam is reversed in its direction of rotation, the hydraulic controls being such that the motion of the plow beam is controlled.

As a particular feature of the present arrangement, the construction of the cross beam 27 is such that it comes, in its two extreme positions, into very close relationship with upstanding steps 83 and 84 formed in the offset base frame side beams 14 and 15. The relationship is such that while a light sliding engagement is had when the parts are not loaded by the plowing stresses, the surfaces of the cross beam 27 and of the steps 83 and 84 flex slightly to come into close abutting relationship during plowing. The plowing forces are in part transmitted directly therethrough, thus relieving some of the plowing strain on the journals 17 and 19. Since the plow beam 26 is inverted only when the plowing operation has been discontinued, the interrelationship of the steps 83 and 84 and of the cross beam 27 is such that they can be separated readily except during actual plowing operations.

Under many circumstances, the entire plow is disconnected from the towing tractor. For that reason, there are conveniently provided at the forward end of the leading beam 13 a pair of manually operated screw jacks 87 and 88. These are standard items and are particularly provided with fastening tubes 89 designed to telescope with fastening studs 91 on the leading beam, being removably secured by cross pins 92. The jacks are shown spaced from the plow in FIG. 3 for clarity in illustration. The jacks are adjustable in height by operation of hand cranks 93, so that when the plow is to be left unattached to the tractor, the jacks can be maneuvered to support the weight of the plow at the forward end, with the attaching pins 22 relieved of stress so that they can be easily removed and the tractor can be driven away. The plow can rest on the jacks and on the rearmost plow discs without difficulty and for an indefinite period.

We claim:

1. A roll-over disc plow comprising a base frame symmetrical in plan about a longitudinal axis and including a transverse leading beam and side beams merging with the ends of said leading beam and having a convergence rearwardly, a coaxial forward journal in said leading beam, a coaxial rearward journal in said convergence, a plow frame including a plow beam extending diagonally in plan across said axis and including a cross beam adapted to flex rearwardly under load, means for mounting said plow frame in said forward journal and in said rearward journal, a plurality of disc plows arranged along and mounted on said plow beam, means interconnecting said plow frame and said main frame for rotating said plow frame about said axis and with respect to said main frame to lie in either of two extreme positions, said side beams each including a forward upper surface and a rearward upper surface vertically offset upwardly from said forward upper surface, said side beams each further including an upstanding step, each of said upstanding steps comprising a substantially vertical surface interconnecting said forward upper surface with said rearward upper surface, said upstanding step being positioned relative to said cross beam so as to be adjacent with said cross beam when said cross beam is unloaded and to be abutted by said cross beam when said cross beam flexes under plowing load.

2. A roll-over disc plow as in claim 1 in which said plow beam when in either of said extreme positions is substantially symmetrical with said axis and in which said steps are effective to abut said cross beam when flexed in both of said extreme positions.

3. A roll-over disc plow as in claim 2 in which said disc plows are arranged on said plow beam in both of said extreme positions thereof with approximately half the number of said disc plows on one side of said axis and half the number of said disc plows on the other side of said axis.

4. A roll-over disc plow as in claim 1 in which said plow beam in transverse cross-section has two laterally and outwardly directed side faces defining a dihedral angle, and some of said disc plows are mounted on one of said side faces and others of said disc plows are mounted on the other of said side faces, effectively positioning said plows more nearly under said plow beam than they would be were said plow beam provided with a single vertical, side face.

5. A roll-over disc plow as in claim 1 in which said means for rotating said plow frame about said axis includes a crank pin on said plow frame adapted to rotate about said axis between two horizontally opposite extreme positions approximately one hundred eighty degrees apart, means including a pair of hydraulic cylinders and pistons for rotating said pin between said extreme positions, and expansible means including a pair of auxiliary hydraulic cylinders and piston rods on said main frame and adapted to engage said plow frame only when said crank pin is substantially in either of said two extreme positions for urging said crank pin vertically partly out of said extreme positions.

6. A roll-over disc plow as in claim 1 in which said means for rotating said plow frame about said axis includes a crank pin on said plow frame adapted to rotate about said axis between said two extreme positions, said extreme positions being approximately one hundred eighty degrees apart and said rotating means further including a hydraulic cylinder and piston mechanism connected to said base frame and said crank pin and movable into a straight locking position without crank effect, and an auxiliary hydraulic cylinder and plunger rod arrangement interposed between said base frame and said plow frame with said rod abutting said plow frame for urging said crank pin vertically partly out of one of said extreme positions.

* * * * *